United States Patent [19]
Olgac

[11] Patent Number: 5,431,261
[45] Date of Patent: Jul. 11, 1995

[54] DELAYED RESONATORS AS ACTIVE DYNAMIC ABSORBERS

[75] Inventor: Nejat Olgac, Willimantic, Conn.

[73] Assignee: University of Connecticut, Storrs, Conn.

[21] Appl. No.: 241,755

[22] Filed: May 12, 1994

[51] Int. Cl.[6] .............................. F16F 7/10; F16M 5/00
[52] U.S. Cl. ............................... 188/379; 248/550; 267/140.14
[58] Field of Search .............. 188/379, 380; 248/550, 248/562, 636; 267/140.14

[56] References Cited

U.S. PATENT DOCUMENTS

| | | | |
|---|---|---|---|
| 3,566,993 | 3/1971 | Leatherwood et al. | 188/379 |
| 3,701,499 | 10/1972 | Schubert et al. | 248/550 X |
| 4,483,425 | 11/1984 | Newman | 248/550 X |
| 4,546,960 | 10/1985 | Abrams et al. | 248/550 X |
| 4,869,474 | 9/1989 | Best et al. | 188/379 X |
| 5,174,552 | 12/1992 | Hodgson et al. | 248/550 X |
| 5,219,143 | 6/1993 | Staple et al. | 248/550 |

FOREIGN PATENT DOCUMENTS

589482  1/1978  U.S.S.R. ............... 188/380

Primary Examiner—Robert J. Oberleitner
Assistant Examiner—Kevin D. Rutherford

[57] ABSTRACT

Vibrations in a structure having a large mass are damped by coupling thereto a damping member of smaller mass and continuously monitoring the frequency of excitation of the structure produced by applied load(s) and the displacement of the damping member. The monitored frequency of excitation and displacement of the damping member are processed together with data relative to the mass, stiffness and damping characteristic of the damping member. A signal is outputted to produce a force acting on the damping member proportional to the displacement of the damping member with a controlled time delay to produce a frequency of vibration in the damping member substantially equal to the monitored frequency of excitation of the structure, this produces resonance of the damping member substantially at the monitored frequency of excitation and is effective to damp substantially the vibrations of the structure at the monitored frequency of excitation. The output signal is variable to produce resonance of the damping member variable over a range of frequencies including the natural frequency of vibration of the structure.

12 Claims, 13 Drawing Sheets

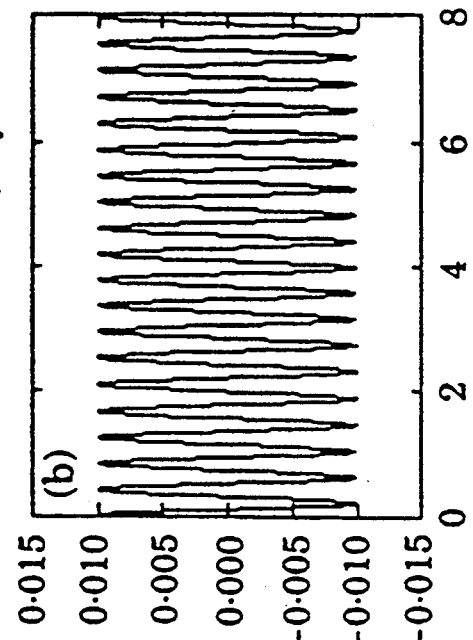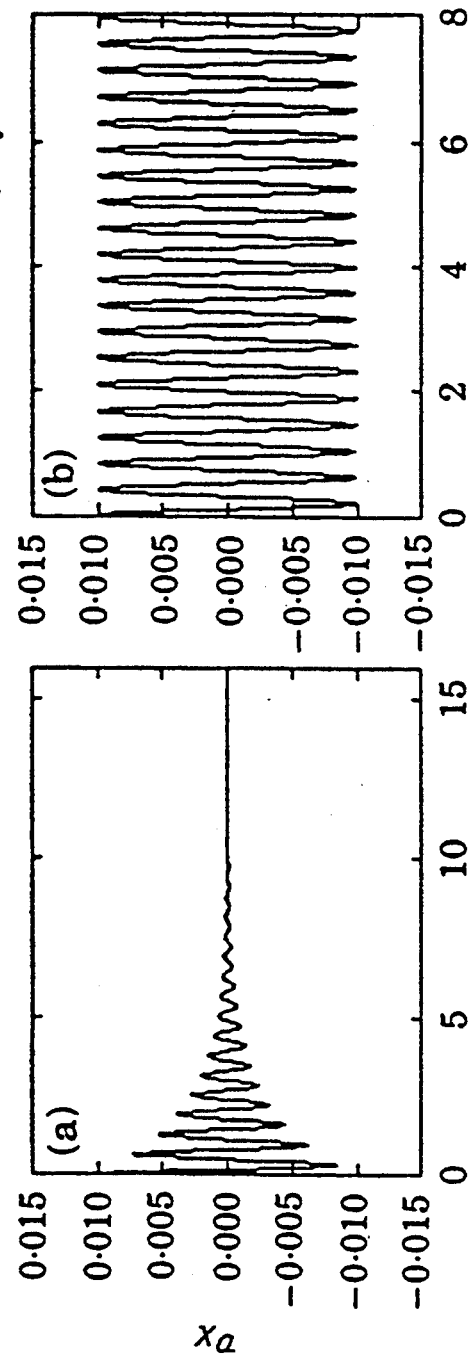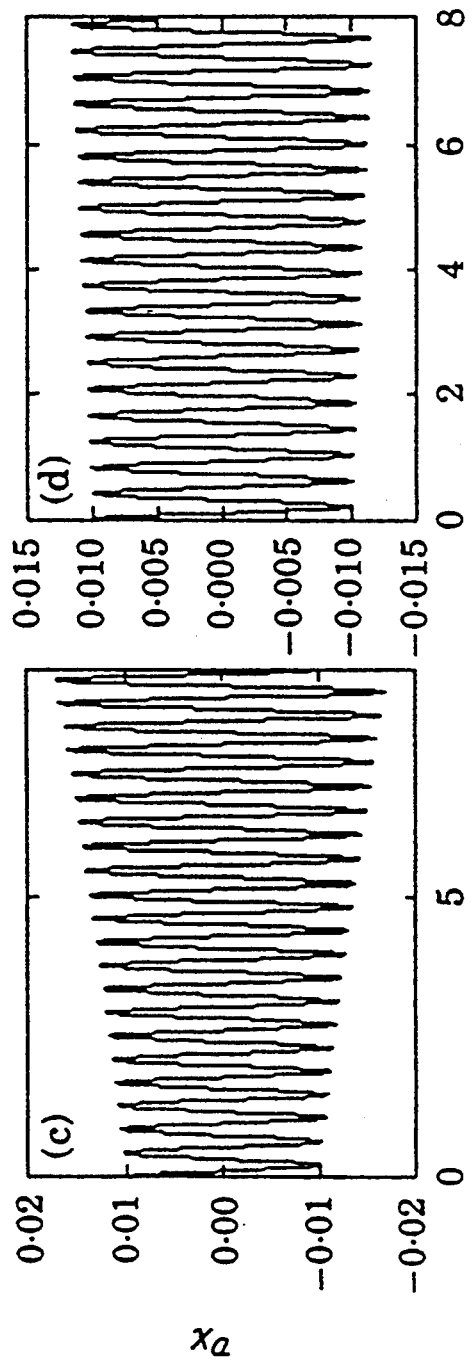
FIG. 6(a)  FIG. 6(b)  FIG. 6(c)  FIG. 6(d)

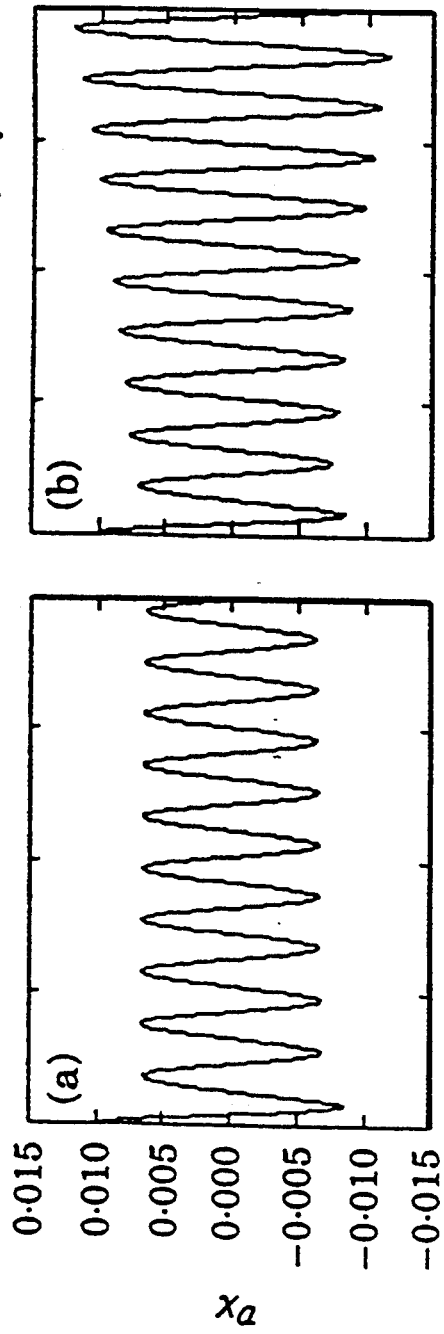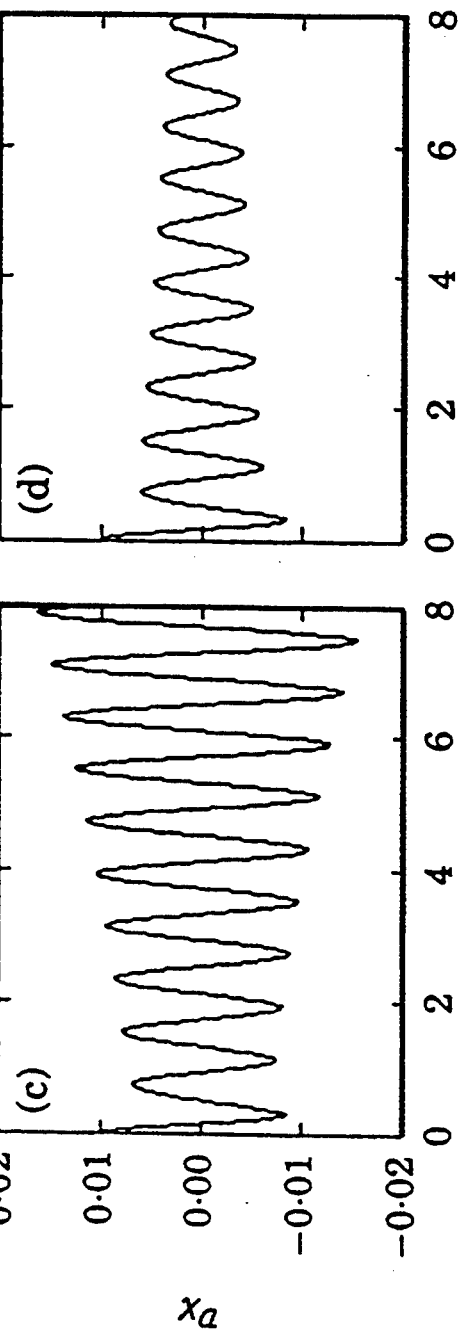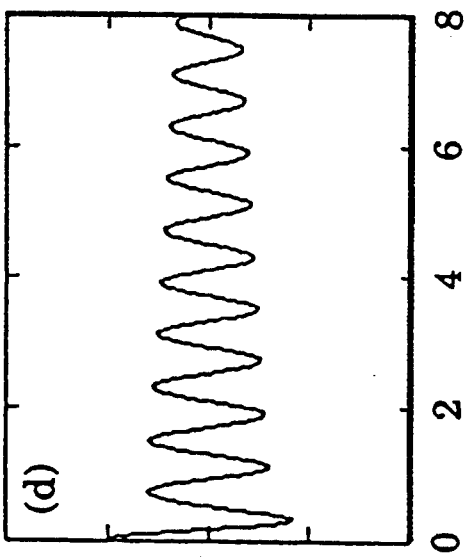

DELAYED RESONATORS AS ACTIVE DYNAMIC ABSORBERS

BACKGROUND OF THE INVENTION

The present invention relates to vibration damping of structures and, more particularly, to the monitoring and dynamic damping of vibrations in a structure by use of additional mass-spring-damper principle.

Engineering structures may be subject to loading conditions which result in displacements adversely affecting their desired performance. This is true with respect not only to static structures, but also moving structures such as motors, rotors and tools. The ensuing stresses due to these disturbances lead to fatigue and subsequent structural failure. As is generally agreed, the most detrimental form of loads are cyclical which cause a vibrational motion which may produce frequencies in the range of the natural frequency of vibration of the structure.

To reduce the deleterious effect of such vibrational motion, numerous methods have been proposed which may be generally grouped in two classes:
  (a) Vibration Isolation. The structure is isolated from the input loads, i.e., the disturbances.
  (b) Vibration Absorption. A modification of the structure is made which makes it non-responsive to the anticipated input disturbances. This mentioned modification may range from a simple alteration of certain structural parameters (e.g., stiffness or damping) to the coupling of a secondary structure to the primary one. This secondary structure is referred to as a vibration absorber. Its purpose is to absorb the energy input of the disturbances, thus reducing their effect on the primary structure.

Input disturbances are typically assumed to be harmonic forcing functions. The practicality of this selection results from the fact that any periodic disturbance may be analyzed as the sum of harmonic functions. Following this conventional analysis, the dynamic response of a structure is attenuated by use of a classical vibration absorber in the form of a mass-spring-damper as illustrated in FIG. 1. This absorber is attached to the primary structure imparting an additional degree of freedom. An absorber properly tuned to the vibrational frequency of the basic structure can highly attenuate the response of the primary system. A tuned absorber is defined as having values of $m_a$, $k_a$, and $c_a$ which yield maximum attenuation of oscillations of the primary structure, as described in many textbooks, e.g., Inman, D. J., *Vibration: with Control, Measurement and Stability*, 1989 Prentice-Hall, Englewood Cliffs, N.J.. Obviously, the ideal absorption in response to harmonic forcing is achieved by introducing an equal and opposite force. An excited spring-mass at its natural frequency, i.e., in resonance, could achieve this objective.

The tuned passive absorber is most effective to remove the undesired oscillations of the primary structure in a narrow and fixed interval of operating frequencies, mainly near the $M_{peak}$ of the absorber section and ideally with $c_a \approx 0$ setting. As a well known drawback, the effect of the absorber rapidly deteriorates outside of this range. If the excitation source is of varying frequency, there must be an absorber "tuned to these vibrations.

There have been numerous studies in the field of active and passive vibration absorption (or suppression). Some recent ones can be listed as Soong, T. T., *Active Structural Control: Theory and Practice*, 1990 Wiley, New York; Soong, T. T., Reinhorn, A. M., Wang, Y. P., Lin, R. C., *Full-Scale Implementation of Active Control. I: Design and Simulation*, Journal of Structural Engineering, 1991 Vol. 117, No. 11.; Yang, J. N., 1988, *Recent Advances in Active Control of Civil Engineering Structures*, Journal of Probabilistic Engineering Mechanics, Vol. 3 1991; Yang, B., *Noncolocated Control of a Damped String Using Time Delay*, Proceedings of the 1991 American Control Conference, Vol. 3, Boston, Mass.; Inman, D. J., 1989 *Vibration: With Control, Measurement and Stability*, Prentice-Hall, Englewood Cliffs, N.J.; Leipholz, H. H. E., and Abdel-Rohman, M., 1986 *Control of Structures*, Martinus Nijhoff, Dordrecht, The Netherlands. In essence, they propose a structural alteration to the primary system to interfere with the behavior of the primary body passively or to subdue actively its vibratory response. All of these techniques are quite effective in their objectives. Briefly, the modified dynamic mechanisms absorb the energy input of the excitation source of the structure.

An essential requirement for this absorption property is that it should be equally effective for a large band of operating frequencies, i.e., it should be tunable without sacrificing the quality of performance. To indicate the practical applications of this "frequency tuning" feature, machine tool vibrations (at the tool-workpiece interface), aircraft fuselage parts, submersible hulls, and lively civic structures are subject to variations in vibrational frequency. Because of the excitation frequency variations imposed on these systems, the absorption must be frequency tuned dynamically to be effective. Most of the earlier techniques fail to respond to this requirement, Those which succeed necessitate time consuming mechanical changes (e.g., Soong, 1991, supra); thus, they are not suitable for practical applications.

This fertile area of engineering is enjoying the advent of new proposals, generally based on computerized active control methods. One recent development in this field is the concept of "Delayed Resonators" (DR) which utilizes position feedback with a controlled time delay as described in Olgac, N., McFarland, D. M., Holm-Hansen, B., *Position Feedback-Induced Resonance: The Delayed Resonator*, DSC—Volume 38, Active Control of Noise and Vibration, ASME-WAM 1992. The originality of this methodology is multifaceted:

(a) It is tunable to practically all possible frequencies of excitation, uniquely utilizing a partial state feedback.
  (b) This tuning can be done in real time.

The structure shown in FIG. 2 represents a single degree of freedom (SDOF) absorber with an additional feedback force $gx_a(t-\tau)$, where g is a feedback gain and $\tau$ is a time delay applied to the displacement $x_a$. Control strategies involving time delay have been considered extensively in the literature, and almost all of them treat time delay as an undesirable property of the dynamics, to be either eliminated or compensated in B. Yang, *Noncollocated Control Of A Damped String Using Time Delay*, Proceedings of the 1991 American Control Conference 3, 1991, 2445–2448, Noncollocated control of a damped string using time delay, M. Abdel-Mooty and J. Roorda, *Time Delay Compensation In Active Damping Of Structures*, Journal of Engineering Mechanics 117, 1991, 2549–2570, and J. Rodeliar, L. L. Chung, T. T. Soong and A. M. Reinhorn, *Experimental*

*Digital Control Of Structures*, Journal of Engineering Mechanics 115, 1989, 1245–1261. The stability aspects of such systems with inherent time delay have also been widely studied in N. Olgac and W. Youping, *On The Stability of Linear Systems With Unrelated Time Delays*, ASME International Computers in Engineering Conference, 1989, K. Youcef-Toumi and O. Ito, *A Time Delay Controller For Systems With Unknown Dynamics*, Transactions of the American Society of Mechanical Engineers, Journal of Dynamic Systems, Measurement, and Control 112, 1990, 133–142, and W. J. Wang, C. C. Kao and C. S. Chen, *Stabilization, Estimation and Robustness For Large Scale Time-Delay Systems*, Control-Theory and Advanced Technology 7, 1991, 569–585. These investigations are almost exclusively initiated to compensate for the delayed response behavior of sensors or actuators.

Since it is a destabilizing factor, delay is seldom intentionally introduced into the system dynamics. An interesting treatment of time delay in the control is given by Yang 1991 supra in an effort to stabilize the non-collocated control of a damped string wherein the propagation delay between the sensor and the actuator must be compensated. However, the propagation delay is still an inherent feature of the dynamics.

Time delay has been proposed as a control design element by K. Youcef-Toumi and J. Bobbett, *Stability Of Uncertain Linear Systems With Time Delay*, Transactions of the American Society of Mechanical Engineers, Journal of Dynamic Systems, Measurements and Control 113, 1991, 558–567, in which an uncertain linear system is stabilized by a delayed state feedback, using Kharitonov and Nyquist philosophies.

It is an object of the present invention to provide a novel method for dynamically damping vibrations of a structure under various applied loads by use of controlled time delay in the feedback controlling a damping member.

It is also an object to effect such damping by delayed resonation of the damping member.

Another object is to provide novel apparatus for dynamically damping vibrations in a monitored structure under varying applied loads by use of controlled time delay.

SUMMARY OF THE INVENTION

It has now been found that the foregoing and related objects may be readily attained to damp vibrations in a structure having a large mass and a natural frequency of vibration. A structure with a large mass is coupled to a damping member of smaller mass, and the frequency of excitation of the structure produced by an applied load(s) and the displacement of the damping member are continuously monitored. The monitored frequency of excitation and displacement of the damping member are processed together with data relative to the mass, stiffness and damping characteristics of the damping member.

Following processing, a signal is outputted to produce a force acting on the damping member proportional to the displacement of the damping member with a controlled time delay to produce a frequency of vibration in the damping member substantially equal to the monitored frequency of excitation of the structure. As a result, the damping member resonates substantially at the monitored frequency of excitation and this resonance is effective to damp substantially the vibrations of the structure at the monitored frequency of excitation.

The output signal is variable to produce resonance of the damping member which is variable over a range of frequencies including the natural frequency of vibration of the structure. The monitoring, processing and signal outputting steps are performed repeatedly to damp vibrations generated by various loads applied to the structure.

The vibration of the damping member is effected by energizing a tunable vibrating means to produce the desired frequency. In one embodiment, an excitation signal of a selected frequency is supplied to an activator to oscillate the damping member at the selected frequency. In another embodiment, an excitation signal of a selected frequency is supplied to a mechanical vibrator to vibrate the damping member at the selected frequency.

Generally, the monitoring step includes monitoring a force transducer on the structure or an accelerometer on the structure to measure the frequency of excitation, and monitoring an linear variable differential transducer (LVDT) to measure displacement.

The delayed resonance damping assembly for coupling to a structure subject to vibration comprises a support to be mounted on the structure, a damping member having a known mass, stiffness and damping characteristics and oscillatable on the support, and means for effecting vibration of the damping member to oscillate it on the support over a range of frequencies. There are also included means for monitoring the frequency of excitation of a structure upon which the assembly is mounted, and means for monitoring the displacement of the damping member during its oscillation.

The monitored information is provided to delayed feedback control means for processing the monitored frequency and displacement together with data relative to the mass, stiffness and damping characteristics of the damping member. The control means generates a signal acting on the damping member vibration means which is proportional to the displacement of the damping member, and the control means provides a controlled time delay to produce a frequency of vibration in the damping member substantially equal to the monitored frequency of excitation of the structure. This produces resonance of the damping member substantially at the monitored frequency of excitation, and the resonance is effective to damp substantially the vibrations of the structure at the monitored frequency of excitation. The output signal is variable to produce resonance of the damping member variable over a range of frequencies including the natural frequency of vibration of the structure on which the damping member is mounted.

BRIEF DESCRIPTION OF THE DRAWINGS

FIGS. 6(a)–6(d) are graphic representations of the simulated oscillations of the mass-spring-damper trio with varying feedback gain and delay selections;

FIGS. 7(a)-7(d) are similar graphic representations of the simulated oscillations of the delayed resonator;

DETAILED DESCRIPTION OF THE PREFERRED EMBODIMENT

The present invention is based upon the application of a proportional feedback of excitation based upon the position or displacement of the damping member as well as the detected frequency of the vibration induced in the primary structure. This dynamically monitored data is processed in a computer together with data concerning the mass, stiffness and damping characteristics of the damping member in accordance with the principles described hereinafter to produce the vibrational force acting on the damping member. This applied force is proportional to the displacement of the damping member and is applied with a controlled time delay so as to produce a frequency of vibration of the damping member which is substantially equal to the monitored frequency of vibration of the basic structural member and which produces resonance of the damping member at the frequency of excitation of the structural member.

As a result of the dynamically controlled delayed feedback and resulting resonance, the damping member will effectively damp the vibrations in the structural member.

Moreover, the damping member and its vibration generating component may be oscillated over a wide range of frequencies depending upon the input to the vibration generating component so as to encompass not only the natural frequency of vibrations of the structural member but also various frequencies which may result from different applied loads, i.e., it is dynamically tuned to the most destructive frequencies of vibration in the structural member. This is enabled by applying feedback time delay as a significant design parameter in the processing of the monitored data.

Figure 2:
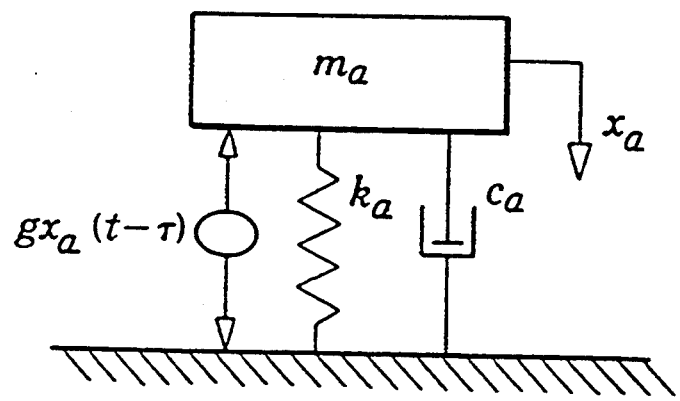
FIG. 2 is a diagrammatic illustration of a mass-spring-damper trio modified to function as a delayed resonator.

In the damping method of the present invention, feedback delay is used in an active control algorithm which produces a designated resonance frequency in the structure in FIG. 2. Specifically, feedback delay is exploited to force the stable dynamics of a mass-spring-damper trio to mimic a simple mass-spring at a designated natural frequency.

Due to the delay element, the characteristic equation of this structure is transcendental. Consequently, it renders infinitely many roots. The control strategy is to select g and $\tau$ so that two of these roots lie on the imaginary axis of the complex plane, while all other roots are in the stable left half-plane (LHP) of the complex space. The roots on the imaginary axis become dominant over the rest. With this proper g and $\tau$ selection, the structure in FIG. 2 behaves like a resonator (i.e., it is marginally stable). Therefore, it is given the sobriquet "Delayed Resonator" (DR). The DR reflects ideal vibration absorber characteristics because the steady state response of the primary structure can be brought to zero, which follows from the fact that the absorber displacement is 180 degrees out of phase with the harmonic input disturbance. The intuitive rationale behind inducing such a resonance frequency is straightforward. The delayed resonator may be considered as a substructure of a larger system which is harmonically excited. If the frequency of excitation is equal to the frequency of the DR, then the latter resonates with a 180 degree phase shift with respect to the excitation and absorbs all of the energy which is introduced to the system.

Figure 1:
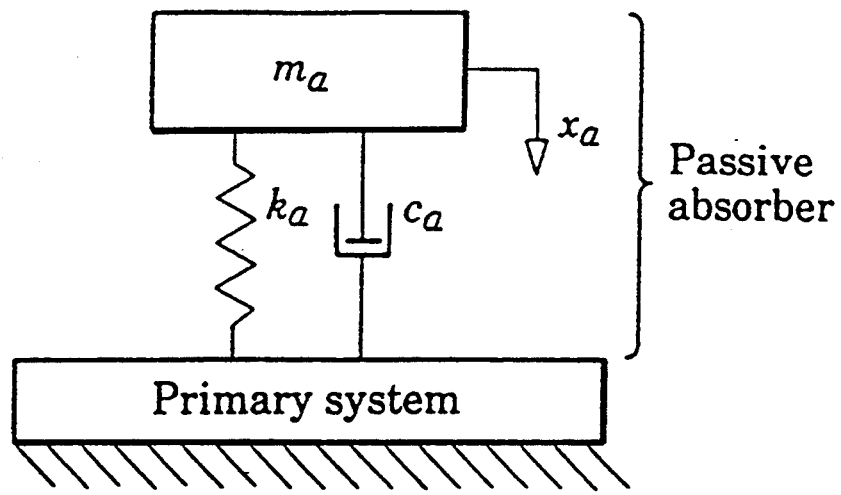
FIG. 1 is a diagrammatic illustration of a conventional mass-spring-damper trio functioning as a passive vibration absorber.

In comparing such a DR with the generic absorber in FIG. 1, the following differences are noted:

(a) The absorber in FIG. 1 is optimized by tuning $M_a$, $k_a$ and/or $c_a$. Predetermined tuning, however, makes this absorber effective only in a small range around its optimized frequency. Furthermore, even when it is most effective, the dynamic response of the primary system cannot be brought to zero due to the presence of a phase shift between the absorber displacement and the input disturbance. This phase shift is clearly a function of the damping.

(b) The operating frequency of the DR can be tuned by scheduling $\tau$ and g in real time. Such a real time control should produce an effective vibration absorption in the presence of harmonic disturbances with varying frequencies.

Accordingly, the method of the present invention reconfigures a spring-mass-damper so that it is marginally stable at a preferred resonance frequency. With these objectives in mind, a DR of the type illustrated in FIG. 2 has the following equation of motion governing the absorber dynamics:

$$m_a x_a + c_a \dot{x}_a + k_a x_a + g x_a(t-\tau) = 0. \tag{1}$$

The corresponding Laplace domain representation leads to the characteristic equation $$m_a s^2 + c_a s + k_a + g\, e^{-\nu} = 0 \tag{2}$$

For g=0, equation (2) reduces to that of the absorber in FIG. 1:

$$m_a s^2 + c_a s + k_a = 0 \tag{3}$$

Equation (3) has two poles in the finite space of the complex plane:

$$s_{1,2} = -\zeta\omega_n \pm \omega_n \sqrt{1-\zeta^2}\, i, \tag{4}$$

-continued where $\zeta = c_a/(2\sqrt{k_a m_a})$ and $\omega_n = \sqrt{k_a/m_a}$.

For $g \neq 0$, equation (2) is a transcendental expression with infinitely many roots. Each root $s = a + \omega i$ has a corresponding gain, g, which is defined by the magnitude condition:

$$g = |m_a s^2 + c_a s + k_a| e^{\tau a}, \quad (5)$$

where $g = |m_a s^2 + c_a s + k_a| e^{\tau a}$, denotes the magnitude, and a and $\omega$ are the real and imaginary parts of the poles, respectively. Equation (5) provides the following information about the locations of the poles for varying values of g, and constant $\tau$: (i) for $g = 0$, two finite poles exist and are given by equation (4)—all other poles are at $a = -\infty$; (ii) for $g = \pm\infty$, $a = +\infty$.

Furthermore, the following angle condition must be satisfied for a root to be a solution of (2):

$$\text{for } g > 0, \; \Delta(m_a s^2 + c_a s + k_a) = (2\kappa + 1)\pi - \tau\omega \quad (6a)$$

$$\text{for } g < 0, \; \Delta(m_a s^2 + c_a s + k_a) = 2\kappa\pi - \pi\omega, \quad (6b)$$

where $k = 0, \pm 1, \pm 2, \pm 3, \ldots$

Utilizing the information from equations (6), the asymptotic directions of the root loci are obtained as $a \to +\infty$:

$$\omega \to (2\kappa+1)\pi/\tau, \text{ for } g \to +\infty; \; \omega \to 2\kappa\pi/\tau, \text{ for } g \to -\infty. \quad (7)$$

Additionally, as $a \to -\infty$, equation (6) yields $$\omega \to (2\kappa+1)\pi/\tau, \text{ for } g \to 0^+; \; \omega \to 2\kappa\pi/\tau, \text{ for } g \to 0. \quad (8)$$

Figure 3:
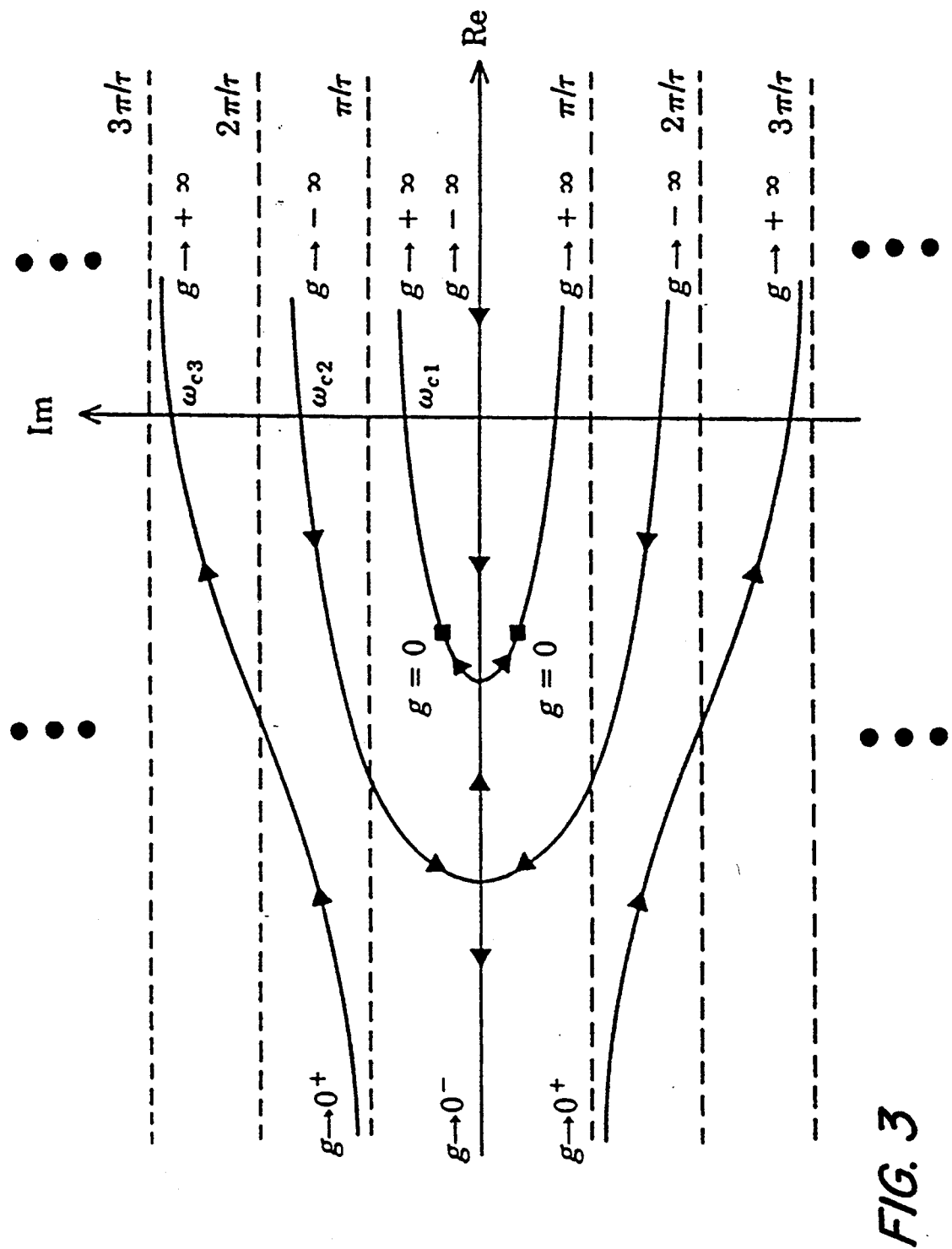
FIG. 3 is a graphic representation of the varying gain root locus of a delayed resonator.

With this information, a sketch of root loci for varying gain and constant delay can be drawn as seen in FIG. 3.

The effectiveness of the DR is due to its marginally stable root distribution. The desired imaginary roots are $s = \pm\omega_c i$, where the subscript c refers to the crossing of the root loci on the imaginary axis. Substitution of this root into equation (2) yields analytical expressions for $\tau$ and g. However, due to the transcendental nature of equation (2), $\tau$ is multi-valued:

$$\tau_c = (1/\omega_c)[\tan^{-1}(c_a\omega_o m_a\omega_c^2 - \kappa_a) + 2\pi l], \quad (9)$$

$$g_c = \pm\sqrt{(c_a\omega_c)^2 + (\kappa_a - m_a\omega_c^2)^2} \quad (10)$$

where $l = 1, 2, 3, \ldots$ These $\tau_c$ and $g_c$ are desired settings of the control parameters to render the DR feature at a preferred $\omega_c$.

It is essential to ensure that the delayed resonator is marginally stable so that only two imaginary poles exist while all others are on the stable LHP. It should be guaranteed that the marginally stable pair $\pm\omega_c i$ is the first pair of poles on the root loci crossing the imaginary axis to the unstable right half-plane (RHP). They can be considered as the front of a cloud of roots. This is one important issue.

Another critical issue is to determine the sensitivity of the poles $\pm\omega_c i$ with respect to the (g, $\tau$) parameters. The tolerable variations of (g, $\tau$) from ($g_c$, $\tau_c$) can be determined only from this evaluation, so that the DR remains marginally stable or close to it on the stable LHP. These two topics are addressed in the following.

Equation (9) shows that if $\tau$ is increased by integer multiples of $\Delta\tau = 2\pi/\omega_c$, the crossing $\omega_c$ will not change, but the loci which cross at $\pm\omega_c i$ will. This is a consequence of the increase in loci density. Regardless of which loci contain $\pm\omega_c i$, the others should carry only stable poles for a given setting of gain and delay. Additionally, the density of the roots should be maintained close to the imaginary axis at a minimum. Hence, $\tau_c$ is calculated with $l = 0$.

The stability issue is highlighted because the control parameters $g_c$ and $\tau_c$ are determined in equations (9) and (10), with no concern for the distribution of the rest of the poles. Therefore, it is possible that some unstable poles are introduced by this parametric selection. This means that a given passive absorber structure ($m_a$, $c_a$, $\kappa_a$) imposes some limitations on the DR concept.

Other investigators have addressed the stability of time delayed systems. For linear dynamics, there is an accepted and systematic approach following an interesting substitution for $e^{-\nu}$ by a rational polynomial: Z. V. Rekasius, *A Stability Test For Systems With Delays*, 1980 Proceedings of the Joint Automatic Controls Conferences TP9-A; A. Thowsen, *Delay-Independent Asymptotic Stability Of Linear Systems*, 1982 IEE Proceedings 129, 73–75; K. Walton and J. E. Marshall, *Direct Method For TDS Stability Analysis*, 1987 IEE Proceedings 134, 101–107; and D. Hertz, E. J. Jury and E. Zeheb, *Simplified Analytic Stability Test For Systems With Commensurate Time Delays*, 1984 IEE Proceedings 131, 52–56. However, the treatment of the problem has considered only one parameter, the time delay. However, for the DR an additional parameter, the gain g, must also be included in this analysis.

Figure 4:
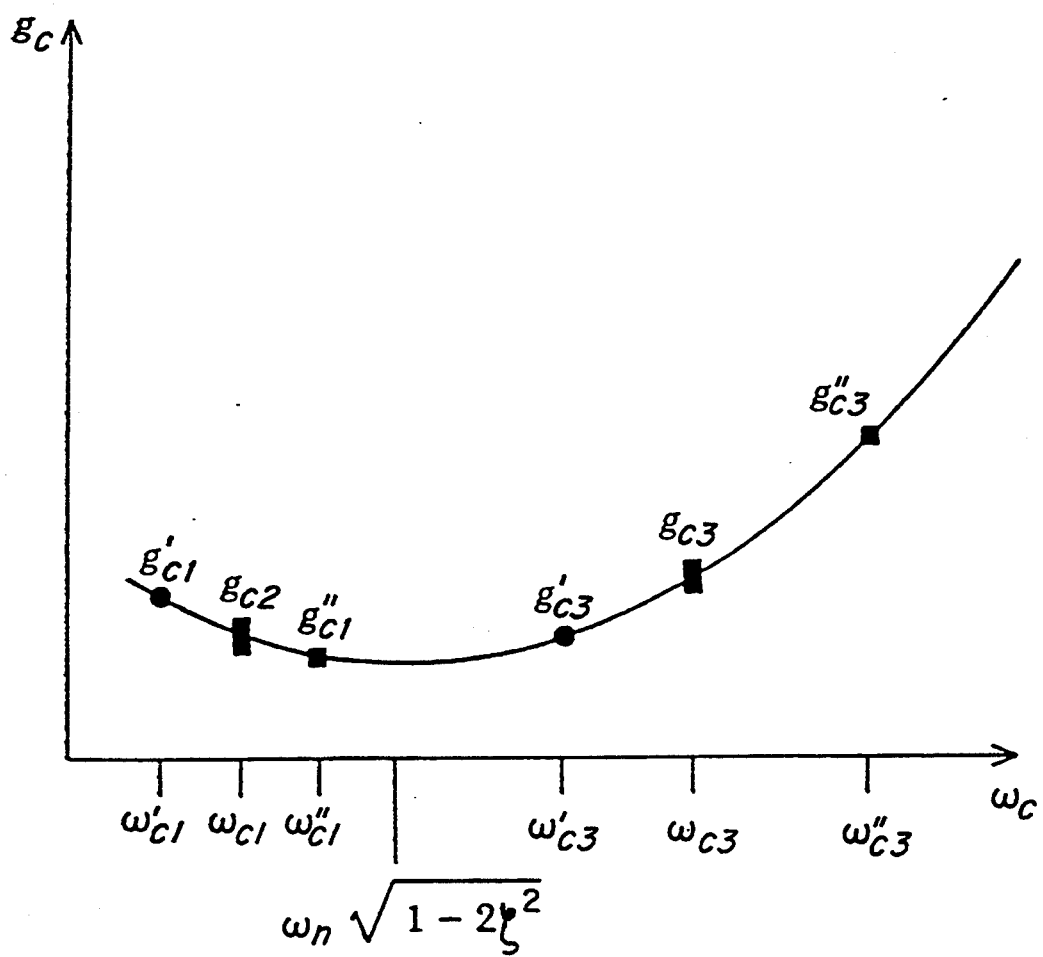
FIG. 4 is a graphic representation of gain variation with the crossing frequency.

Equation (10) defines the relation between the gain $g_c$ and the crossing frequency $\omega_c$, as depicted in FIG. 4. It is easy to show that there is a minimum gain for a given absorber structure which occurs at $\omega_n(1 \pm 2\zeta^2)^{\frac{1}{2}}$. The crossing frequency $\omega_c$ (of the abscissa) has a direct relation with $\tau_c$ through equation (9). Assume that a delay $\tau_0$ is designated so that the following conditions prevail;

$$\omega_{c1} < \omega_n\sqrt{1 \pm 2\zeta^2}, \; \omega_{c3} > \omega_n\sqrt{1 \pm 2\zeta^2}, \quad (11)$$

where $\omega_{c1}$, $\omega_{c2}$, $\omega_{c3}$, etc. are the crossing frequencies of the first, second, third, etc. loci branches (FIG. 3). Note that $\omega_{c2}$ corresponds to $g < 0$. An increase in the delay $\tau_0$ causes the crossings to shift downwards along the imaginary axis of the root locus or, equivalently, to the left along the frequency axis of the $g_c$ plot (FIG. 4). Thus $g_{c3}$ ($\tilde{\omega}_{c3}$) decreases and $g_{c1}$ ($\tilde{\omega}_{c1}$) increases. The critical point, from the stability aspect, is the delay $\tau_{critical}$ for which $g_{c1} = g_{c3}$. Above this critical delay $\tau_{critical}$, to which corresponds a minimum $\omega_c$ defined by equation (9), $g_{c3} < g_{c1}$ holds. That is, if $\tilde{\omega}_{c1}$ is the designated crossing frequency, instability ensues because the crossing at $\tilde{\omega}_{c3}$ occurs when $g = g_{c3}(\tilde{\omega}_{c3})$, which is less than $g_{c1}(\tilde{\omega}_{c1})$ (FIG. 4). This is due to the fact that increasing g drives a marginally stable root into the unstable RHP, as shown in FIG. 3.

A decrease from $\tau_{critical}$ will cause the crossing frequencies to move up the imaginary axis of FIG. 3 or, equivalently, to the right along the frequency axis of FIG. 4. Since $g_{c1}(\tilde{\omega}_{c1}) < g_{c5}(\tilde{\omega}_{c5}) < \ldots$ holds for this case, the $\omega_c = \tilde{\omega}_{c1}$ relationship is achieved with all other poles being in the stable left half-plane. Thus, the condition $\tau_c < \tau_{critical}$, or more practically, the equivalent condition $\omega_c > \omega_{critical}$, should be enforced. This brings a lower boundary limitation to the DR. However, theoretically there is no upper boundary to the operational frequency, $\omega_c$.

The system is marginally stable for a $(\tau_c, g_c)$ operating point. This property should also be maintained for practical deviations in $\tau$ and $g$ within some tolerances.

Figure 5:
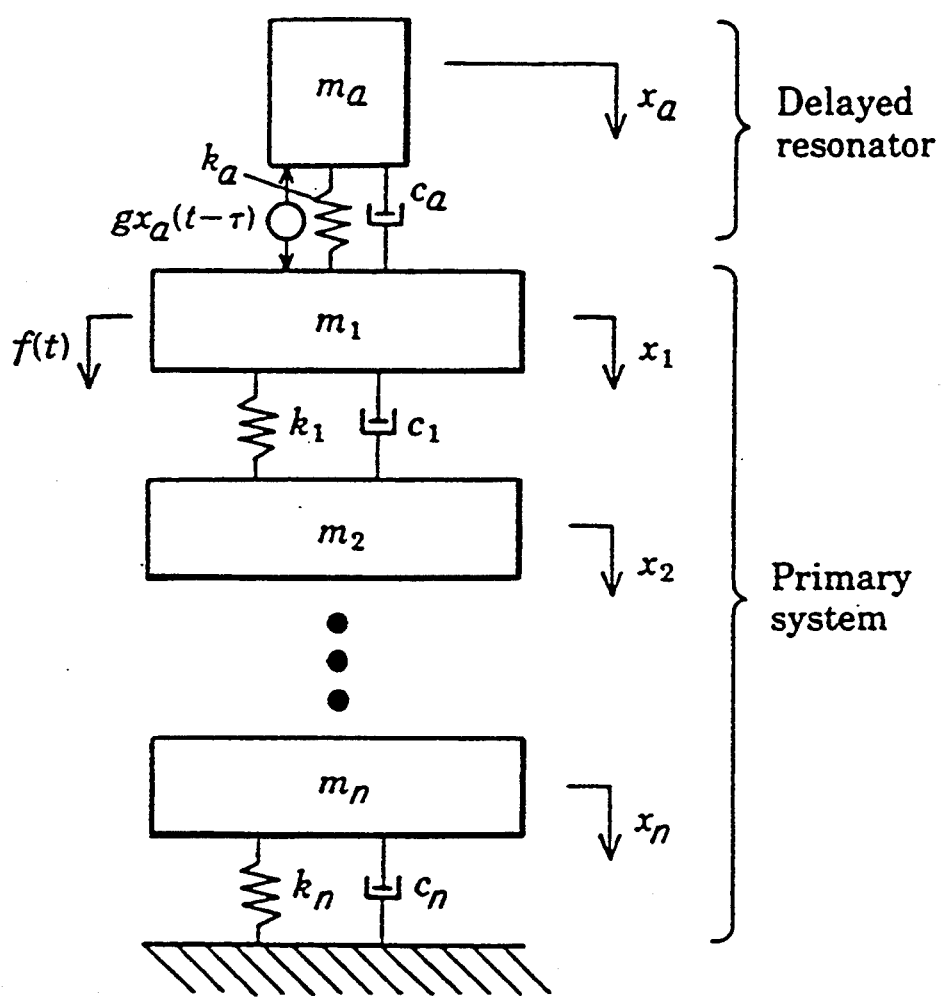
FIG. 5 is a diagrammatic illustration of a global system with multiple degrees of freedom.

The DR vibration absorption tool is appended to a multi-degree-of-freedom (MDOF) primary structure, thus introducing an additional degree of freedom, as shown in FIG. 5. The control parameters $g$ and $\tau$ are tuned so that the absorber removes the effect of an external harmonic force, $f(t)$, on the primary structure. The characteristic equation of the primary system in FIG. 5 can be written as $$P(s) = p_{2n}s^{2n} + p_{2n-1}s^{2n-1} + \ldots + p_0 = 0, \quad (12)$$

where n is the number of degrees of freedom of the primary system.

The global system's characteristic equation for n=1 is $$G(s) = (m_a s^2 + c_a s + k_a)P(s) + M_a s^2(c_a s + k_a) + g\, e^{-\nu} P(s) = 0, \quad (13)$$

which can be rewritten as $$G(s) = A(s) + g\, e^{-\nu} P(s) = 0, \quad (14)$$

where $$A(s) = (m_a s^2 + c_a s + k_a)P(s) + m_a s^2(c_a s + k_a). \quad (15)$$

Equation (14) is the general form of the characteristic equation for the structure. Following parallel steps, an equation for the magnitudes and another for the angles are obtained, respectively as $$|g| = (|A|/|p|)e^{ta}, \quad (16)$$

where $a = \Re(s)$, and $$\Delta P - \Delta A = (2k+1)\pi + \tau\omega, \text{ for } g > 0, \quad (17a)$$

$$\Delta P - \Delta A = 2k\pi + \tau\omega, \text{ for } g < 0, \quad (17b)$$

where $k = 0, \pm 1, \pm 2, \pm 3, \ldots$

From equation (16) note that as $g \to \pm\infty$, 2n poles approach the roots of P(s) and the rest tend to $s = \infty \pm \omega i$, where $\omega$ is determined from equations (17). Thus, as g is varied from 0 to $+\infty$, the global system goes from the stable domain to the marginally stable and ultimately to the unstable domain. From equation (16), in order to possess purely imaginary poles, $s = \pm \omega_c i$, $$|g|_{s=\omega ci} = |A|/|P| \quad (18)$$

should be obtained. For a particular delay $\tau = \tau_0$, the global system crossings, $\omega_{ci}(\tau_0)$, are defined by equation (17) and the corresponding gains by equation (18), where the subscript $i = 1, 2, 3, \ldots$ refers to the first, second, third, etc., crossings. The required gain of resonator g for the particular $\omega$ should not invite unstable roots for the global system. Therefore, g should be smaller than the infemum of the crossing gains $g_{ci}$ of the global structure. Thus $$g < g_{min}(\omega_{ci}(\tau_0)), \quad (19)$$

where $$g_{min} = \text{infemum} \begin{Bmatrix} g(\omega_{c1}) \\ g(\omega_{c3}), \\ g(\omega_{c5}) \\ \vdots \end{Bmatrix} \text{ for } \tau = \tau_0$$

A mass-spring-damper trio is selected first. Then a DR is formed around it. The first set of simulations reflect the dynamic characteristics of this DR. The numerical values considered for the simulations are $m_a = 1.0$ kg, $k_a = 100$ N/m and $\zeta_a = 0.05$ ($c_a = 1$ kg/s).

The free vibration of the trio is compared with the free vibration of the DR. The initial conditions are taken as $x(0) = 0.01$ m and $dx(0)/dt = 0.0$ m/s. The free vibration is shown in FIG. 6(a). It is clearly a dissipative and stable behavior. Selecting $\omega_c = 15$ rad/s requires characteristic poles to be placed at $s = \pm 15i$ by the DR. The delay and gain are determined from equations (9) and (10), respectively, to be $\tau_c = 7.962$ ms and $g_c = 125.90$ N/m. The DR is stable for all $\omega_c > 6.002$ rad/s. Implementing the feedback loop with $\tau_c$ and $g_c$ produces the dynamic behavior of FIG. 6(b), which clearly shows that the DR is marginally stable, i.e., the dissipative characteristics of the mass-spring-damper trio have been removed. Since $\omega_c > \omega_n(1-2\zeta^2)^{\frac{1}{2}} = 9.975$, the increase in delay $\tau = \tau_c + \Delta\tau$ should make the resonator unstable. This is clear in FIG. 6(c) with $\Delta\tau = 1.0$ ms. The similar scenario for $g = g_c + \Delta g, \Delta g = 5.0$ N/m, is shown in FIG. 6(d).

A root is designated $s = 8i$ ($\omega_c = 8$ rad/s). From equations (9) and (10), $\tau_c = 365.4$ ms and $g_c = 36.88$ N/m. With these the resonator is made marginally stable at this new frequency, as shown in FIG. 8(a). Since $\omega_c < \omega_n(1-2\zeta^2)^{\frac{1}{2}}$, *instability results from* $\tau = \tau_c - \Delta\tau$, $\Delta\tau = 0.01$ s and/or $g = g_c + \Delta g, \Delta g = 4.0$ N/m. These expectations are verified in FIGS. 7(b) and (c) respectively. Furthermore, stability is expected to result from $\tau = \tau_c - \Delta\tau, \Delta\tau$. This is shown in FIG. 7(d).

These simulations verify the concept presented earlier for establishing a DR. Specifically, a stable mass-spring-dashpot trio is forced to exhibit non-dissipative (i.e., conservative) characteristics by utilizing delayed position feedback. This resulting delayed resonating structure, the DR, is now available to be used as a novel vibration absorber, with the unique feature that it can be tuned in real time.

Figure 8:
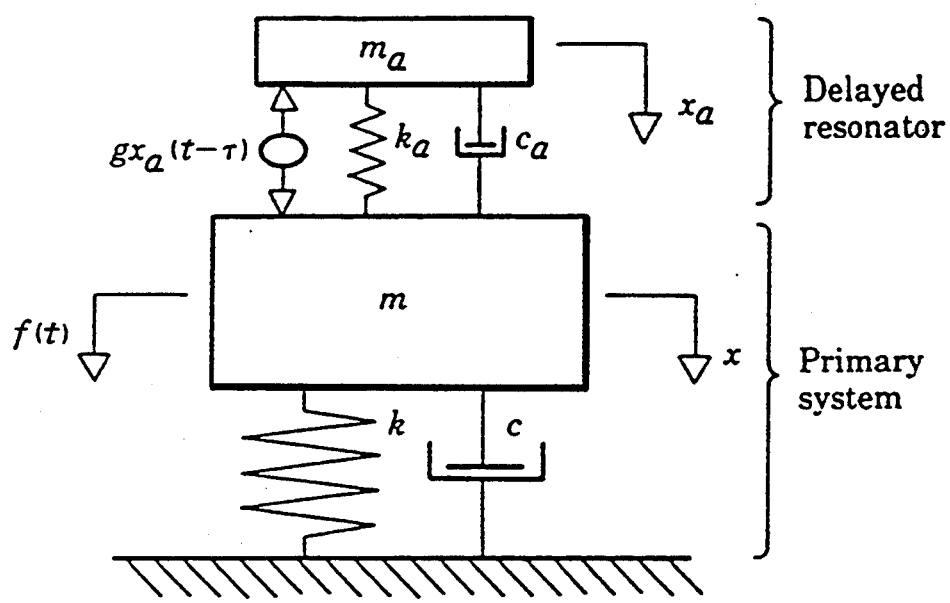
FIG. 8 is a diagrammatic representation of a simulated global system employing the delayed resonator principle.
Figure 9A:
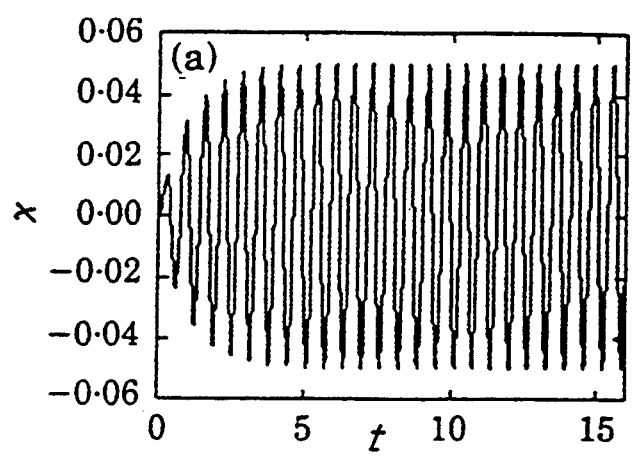
FIGS. 9(a)-9(c) are graphic representations of the harmonic response of the global system of FIG. 8 with (a) no absorber, (b) delayed resonator as an absorber, and (c) tuned passive absorber.

Corresponding computer simulations of the global system are presented next. The primary system is taken as a single degree of freedom structure. The DR is appended to it, and the resulting global structure is shown in FIG. 8. The primary structure is subject to a harmonic load $f(t) = \sin(\omega t)$, where $\omega$ is the frequency of $f(t)$, in rad/s. The primary system parameters are taken as $m = 1$ kg, $k = 100$ N/m and $\zeta = 0.10$ ($c = 2$ kg/s). This system has a peak frequency response at $\omega = \omega_n(1-2\zeta^2)^{\frac{1}{2}} = 9.90$ rad/s, where $\omega_n = (k/m)^{\frac{1}{2}} = 10$ rad/s. Thus, applying $f(t) = \sin(\omega t)$ to the primary system results in the maximum response, which is shown in FIG. 9(a). To utilize the DR as a vibration absorber, it is designed so that the absorber mass is taken to be 10% of the primary system mass. Also, taking small stiffness and damping to avoid large feedback gains, the following parameters for the resonator are selected: $m_a=0.1$ kg, $k_a=10.0$ N/m, $\zeta=0.05$ ($c_a=0.1$ kg/s). With these physical parameters and $\omega_c=\omega=9.90$ rad/s, the feedback delay and gain are $\tau_c=0.1787$ s and $g_c=1.0098$ N/m. Furthermore, with this delay $\tau_c$ the global system is stable for all g<2.3380 N/m.

Figures 9B, 9C:
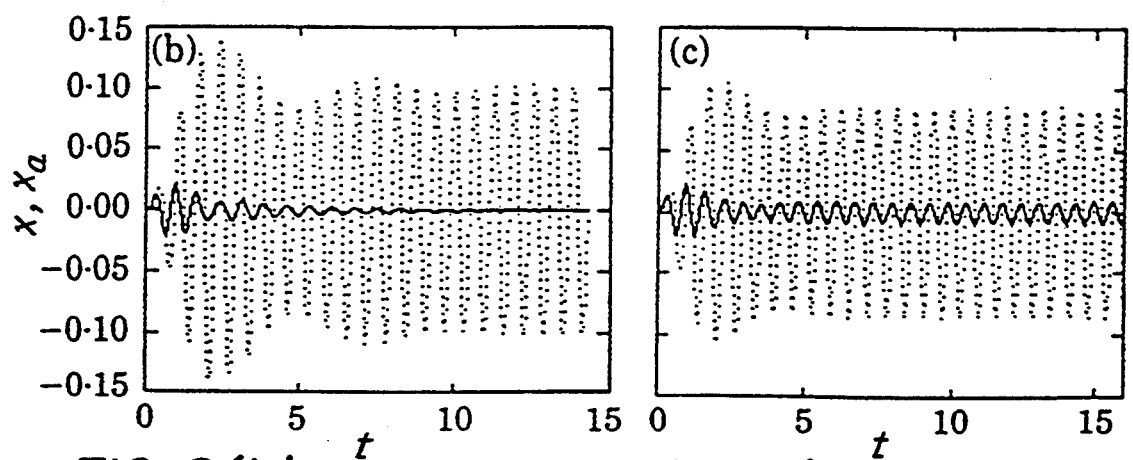

Again applying $f(t)=\sin(\omega t)$ to the primary system, the absorber is effective in removing the dynamic response, as shown in FIG. 9($b$). If the gain is set to zero, the result is a passive absorber, and its response is shogun in FIG. 9($c$). The superiority of the DR is clearly visible.

The above example cases demonstrate the efficiency of the DR in response to simple harmonic excitations. For more general forcing functions, the DR should be tuned to remove the effect of the fundamental forcing frequency, which may also be a function of time.

The present invention was also evaluated in a vibration absorption experimental apparatus consisting of a single degree of freedom (SDOF) primary system subject to a simple harmonic excitation. A Delayed Resonator (DR) was appended to the primary system to test the performance of the DR as a vibration absorber. A schematic of the apparatus is shown in FIG. 10, and the associated electronic hardware is shown in FIG. 11.

Figure 10:
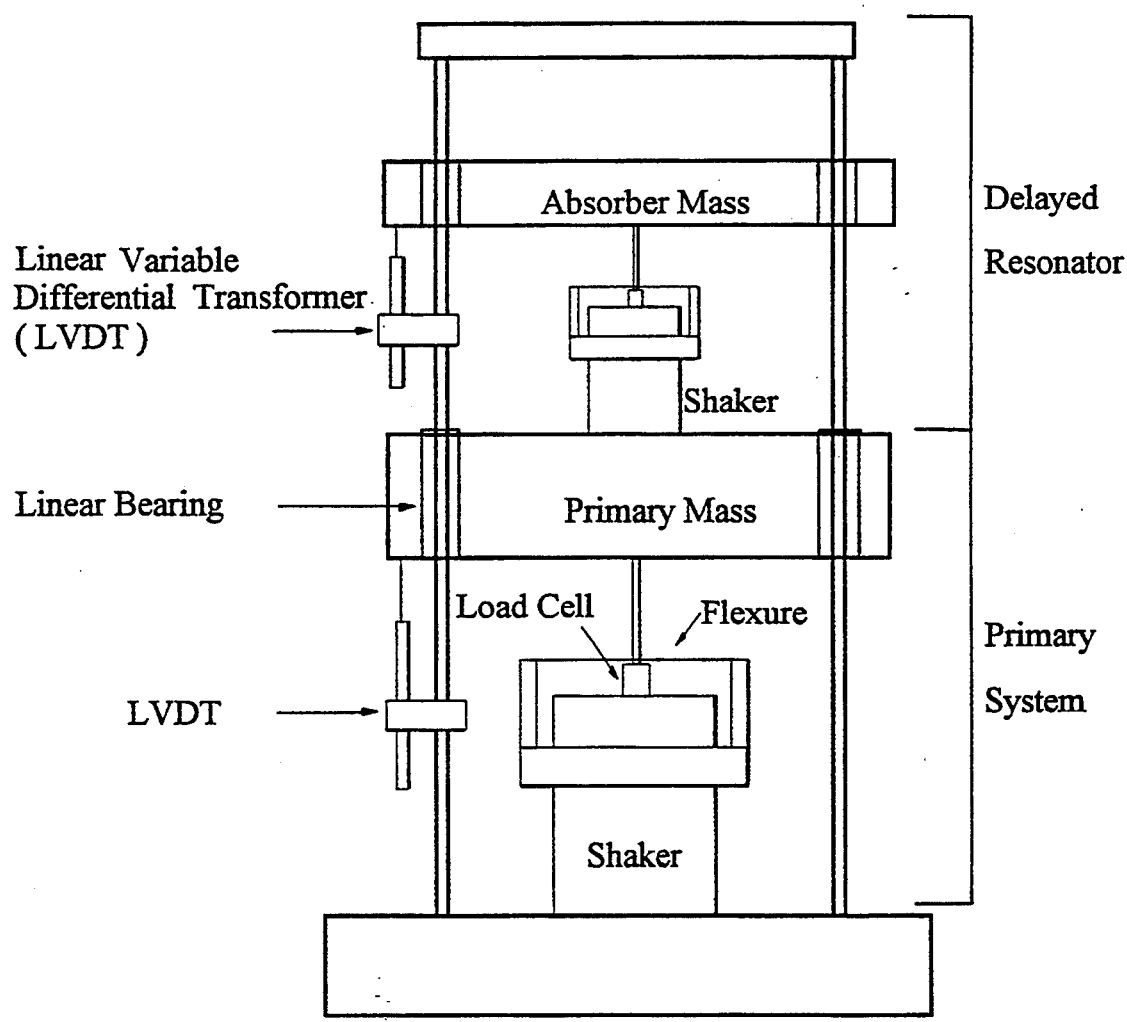
FIG. 10 is a diagrammatic illustration of a delayed resonator mechanical assembly coupled to a mass in accordance with the present invention.
Figure 11:
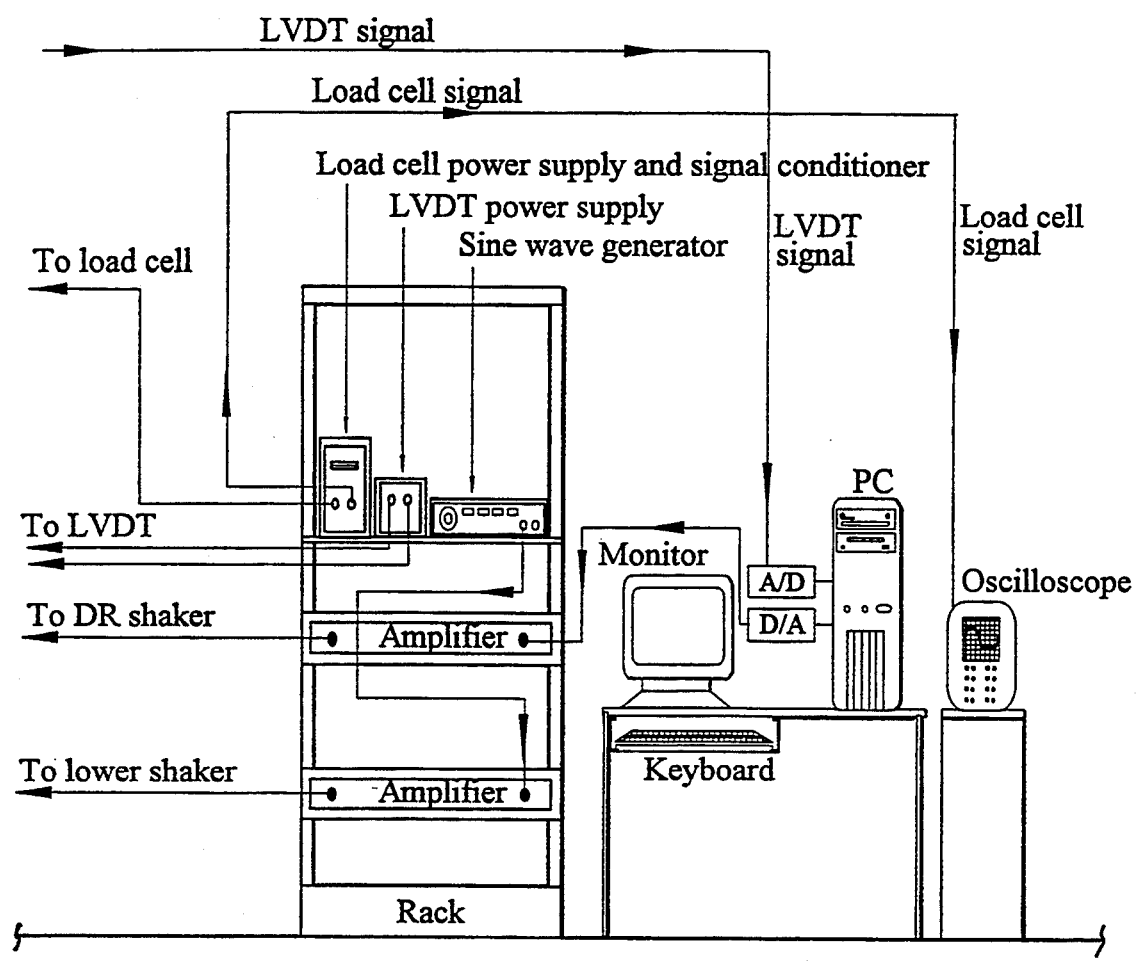
FIG. 11 is a schematic representation of the electronic instrumentation coupled to the mechanical elements of the Delayed Resonator of FIG. 10.

The structure shown in FIG. 10 has the following parameters:
Absorber:
  mass: $m_a=0.7756$ kg
  stiffness: $k_a=11.58$ N/mm
  damping: $c_a=14.40$ kg/s
Primary System
  mass: m=7.756 kg
  stiffness: k=37.36 N/mm
  damping: c=107.7 kg/s The $M_{peak}$ of the primary system is 11 Hz.

Figure 12:
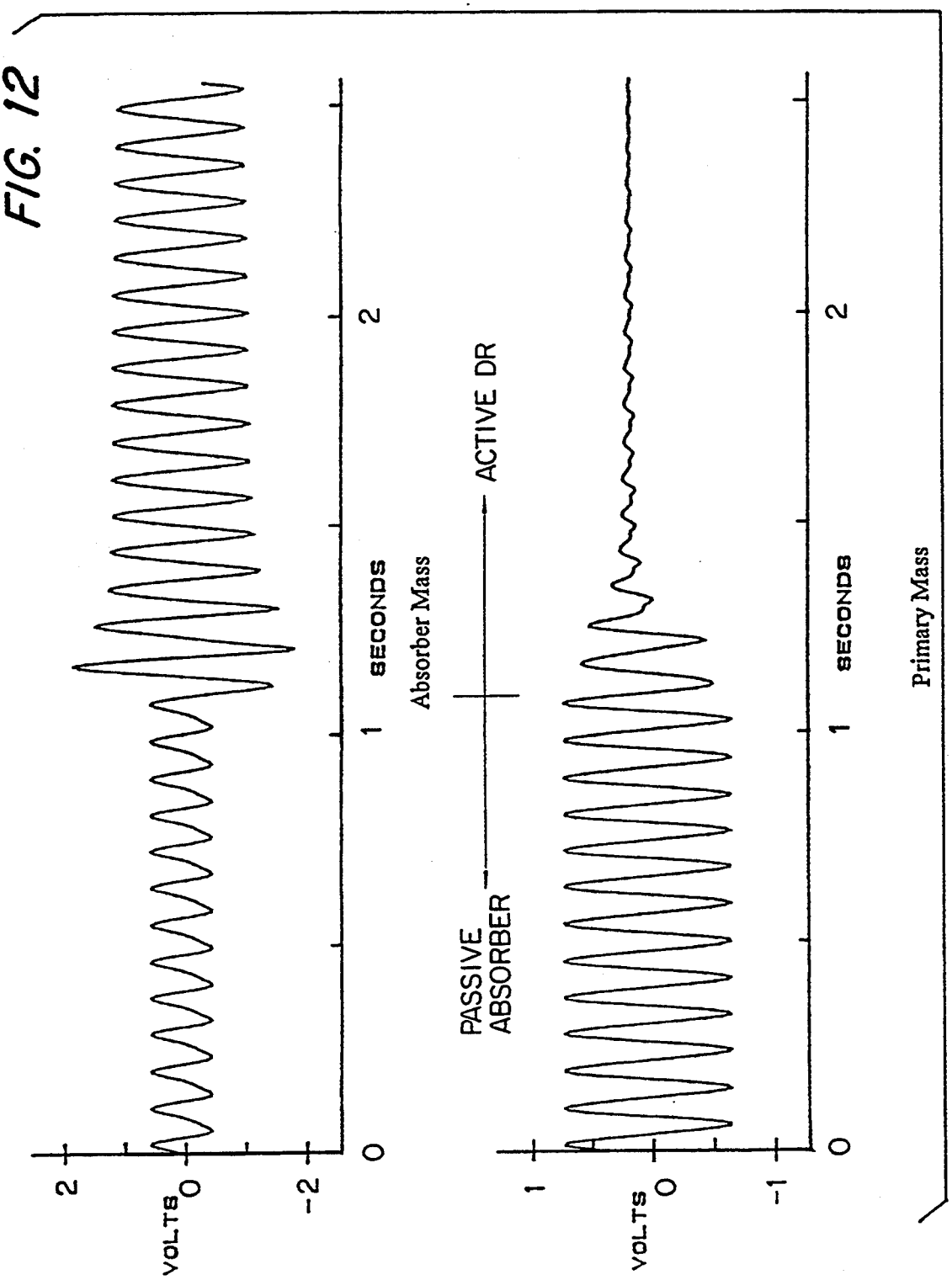
FIG. 12 is a graphic representation of the outputs of the LVDT.

In order to test the effectiveness of the DR, the primary mass was excited near its $M_{peak}$ frequency, and the displacement of the absorber mass was fed back with an appropriate gain (7.598 N/mm) and delay (41.6 ms). The absorber and primary mass displacements were sensed with Lucas-Schaevitz LVDT models DC-E 500 and DC-E 250 respectively. The respective constants of these instruments are 20.675 volts/inch and 41.930 volts/inch. FIG. 12 shows the LVDT outputs for the experimental test at 11.5 Hz. The feedback loop was activated approximately 1.1 seconds after data acquisition began. As can be seen, the delayed resonator is clearly an extremely effective vibration absorber, removing about 95% of the oscillations of the primary mass.

The delayed resonator assembly includes a support such as a rigid plate which can be bolted or otherwise affixed to the structure which is to be damped. This support should include guides for oscillation of the damping member relative thereto, such as the posts shown in the diagrammatic illustrations, and these conveniently extend through apertures in the damping member. In this manner, the damping member will oscillate in an essentially parallel plane to the surface of the mounting plate and the underlying structure.

TABLE ONE

| Example case | Primary Structure | Absorber | Frequency Range (Hz) | DR gains $g_{min}, g_{max}$ (N/mm) | Delay $\tau_{min}, \tau_{max}$ (ms) | Minimum absorption frequency (Hz) | Excitation force amplitude (N) | Max. DR displacement (mm) |
|---|---|---|---|---|---|---|---|---|
| Helicopter power shaft | m = 1000 kg<br>k = 2000 N/mm<br>$\zeta$ = 10% | $m_a$ = 50 kg<br>$k_a$ = 1250 N/mm<br>$\zeta_a$ = 8% | 12–40 | 199–1934 | 0.657–40.36 | 7.05 | 2000 | 7.04 |
| Large hulls | m = 200 kg<br>k = 1000 N/mm<br>$\zeta$ = 5% | $m_a$ = 10 kg<br>$k_a$ = 500 N/mm<br>$\zeta_a$ = 8% | 12–50 | 79.7–499.7 | 0.722–40.86 | 11.27 | 10 | 0.176 |
| Gearbox | m = 150 kg<br>k = 400 N/mm<br>$\zeta$ = 7% | $m_a$ = 0.1 kg<br>$k_a$ = 80000 N/mm<br>$\zeta_a$ = 2% | 1000–4000 | 17073–76055 | 0.118–0.498 | 8.29 | 10 | 0.0025 |
| Boring bar | m = 2 kg<br>k = 200 N/mm<br>$\zeta$ = 5% | $m_a$ = 0.2 kg<br>$k_a$ = 1200 N/mm<br>$\zeta_a$ = 2% | 300–500 | 48–776 | 0.025–1.62 | 49.26 | 20 | 0.028 |

As is well known, various devices may be employed to monitor the frequency of excitation of the applied load(s) in the structural member including force transducers and accelerometers. Similarly, various devices may be mused to monitor the displacement of the damping member from a reference plan which can be at a point along the length of the guide posts in the illustrated embodiment. Such devices include a linear variable differential transducer (LVDT) and an optical measuring means such as an interferometer.

The vibrating force on the damping member may be effected over a fairly wide range of frequencies by actuators which are drivable at various frequencies and by mechanical vibrators of various types.

The computer or microprocessor stores data concerning the mass, stiffness and damping characteristics of the damping member, and the algorithms selected for the particular assembly as described hereinbefore. Inputs from the vibration monitor on the structural member and the displacement monitor for the damping member are received and processed to output the signals to the vibrating element for the damping member.

The Delayed Resonator may be readily applied to buildings, bridges and other fixed structures. Applications of the Delayed Resonator for damping vibrations in moving and rotating machinery are illustrated in FIGS. 13–16.

Figure 13:
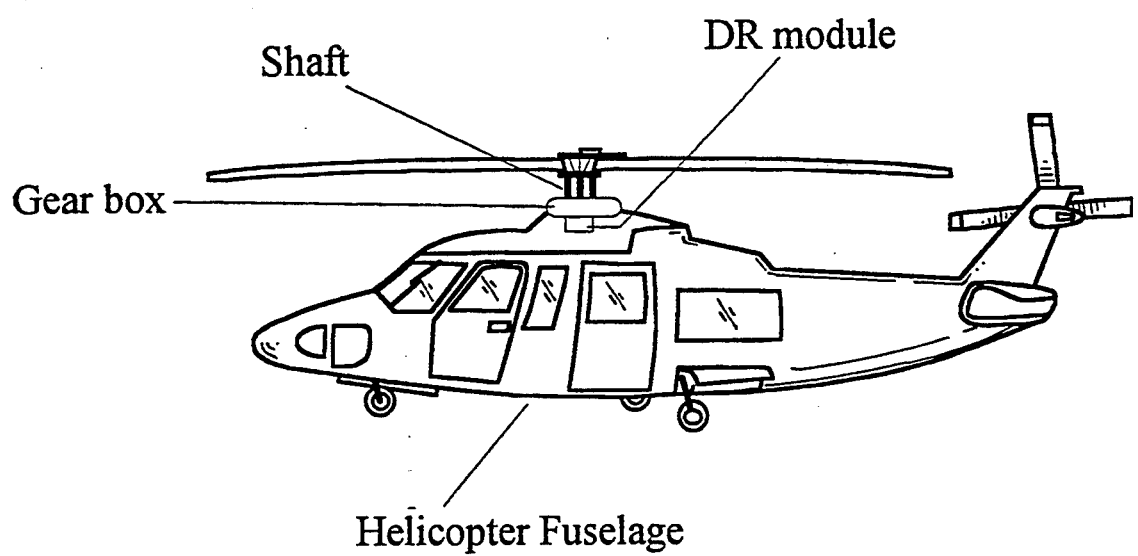
FIG. 13 diagrammatically illustrates the application of the present invention to the damping of vibrations of the power shaft of a helicopter.

In FIG. 13, the Delayed Resonator module is coupled to the gear box for the rotor shaft of a helicopter so as to damp vibrations generated in the rotor shaft and minimize the transfer of vibrations to the fuselage of the helicopter. In Table One are set forth design parameters for the damping member and elements of the algorithm to produce resonance in a typical rotor shaft.

Figure 14:
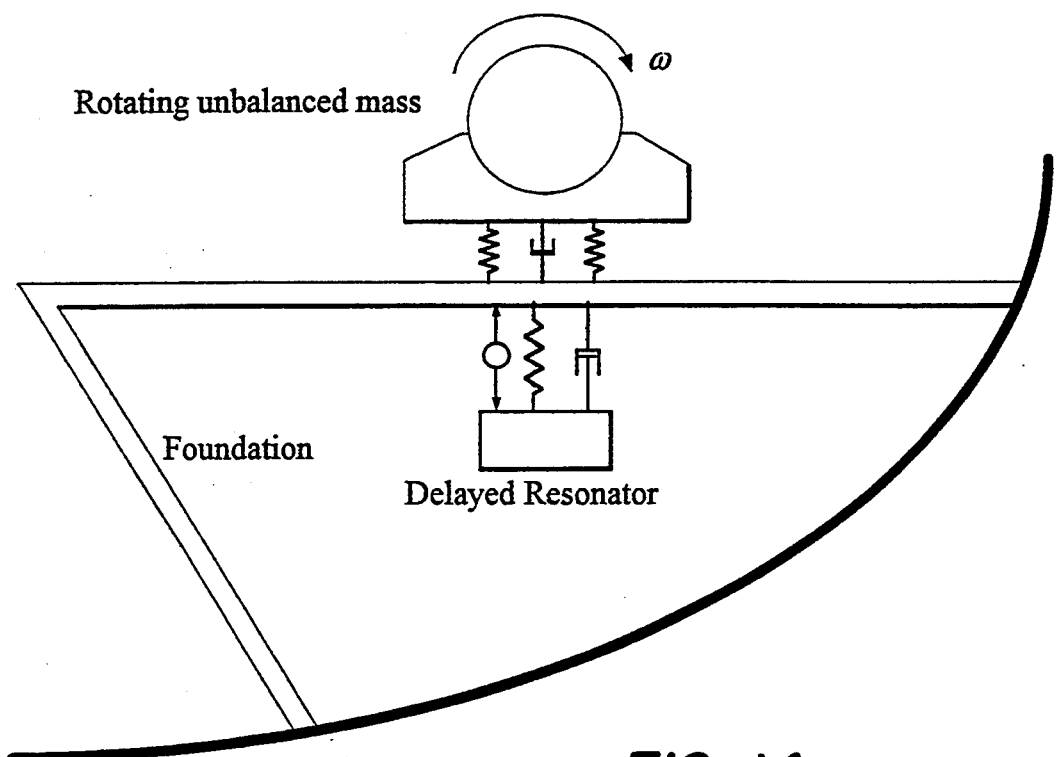
FIG. 14 diagrammatically illustrates the application of the present invention to the damping of vibrations of a motor supported on the large pressurized hull of a submarine.

FIG. 14 illustrates the application of the DR module so as to damp vibrations being transferred from a motor to a structural support so as to damp vibrations on the pressurized hull of a submersible. Table One again provides data for a typical installation.

Figure 15:
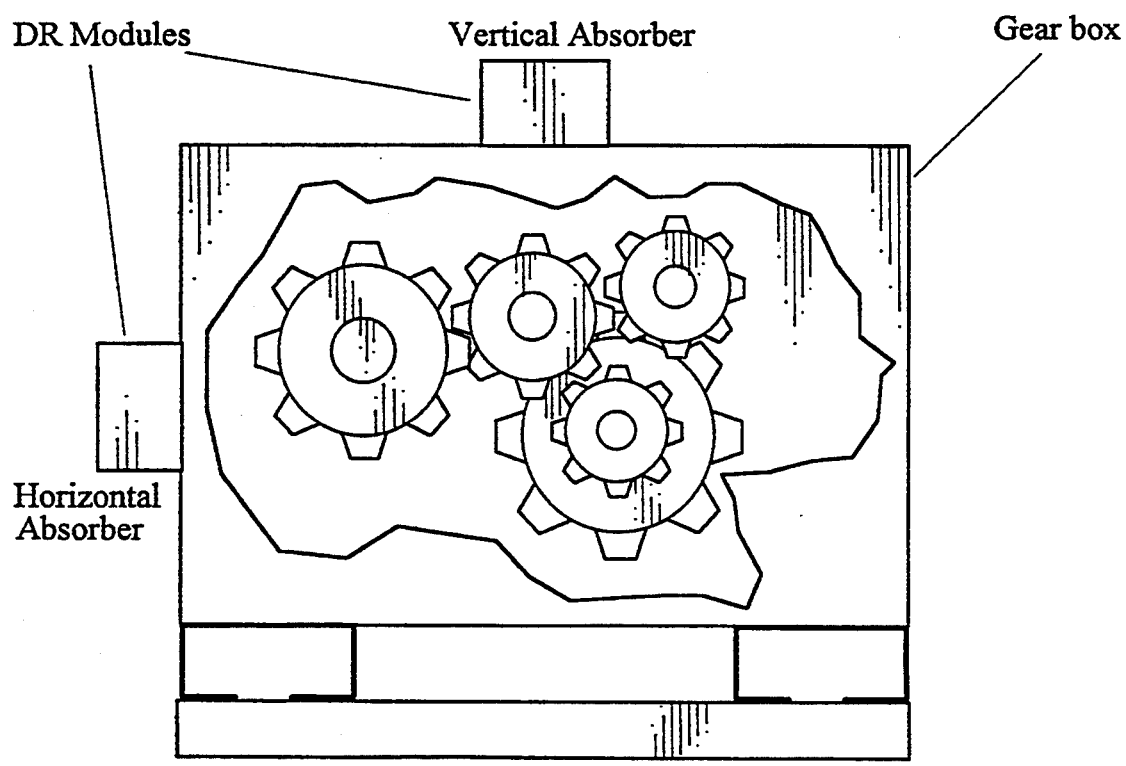
FIG. 15 diagrammatically illustrates the application of the present invention to the damping of vibrations in a high speed, high power gear box.

FIG. 15 shows the application of two DR modules to the enclosure of a gear box to damp vibrations in vertical and horizontal planes, and Table One sets forth exemplary data therefor.

Figure 16A:
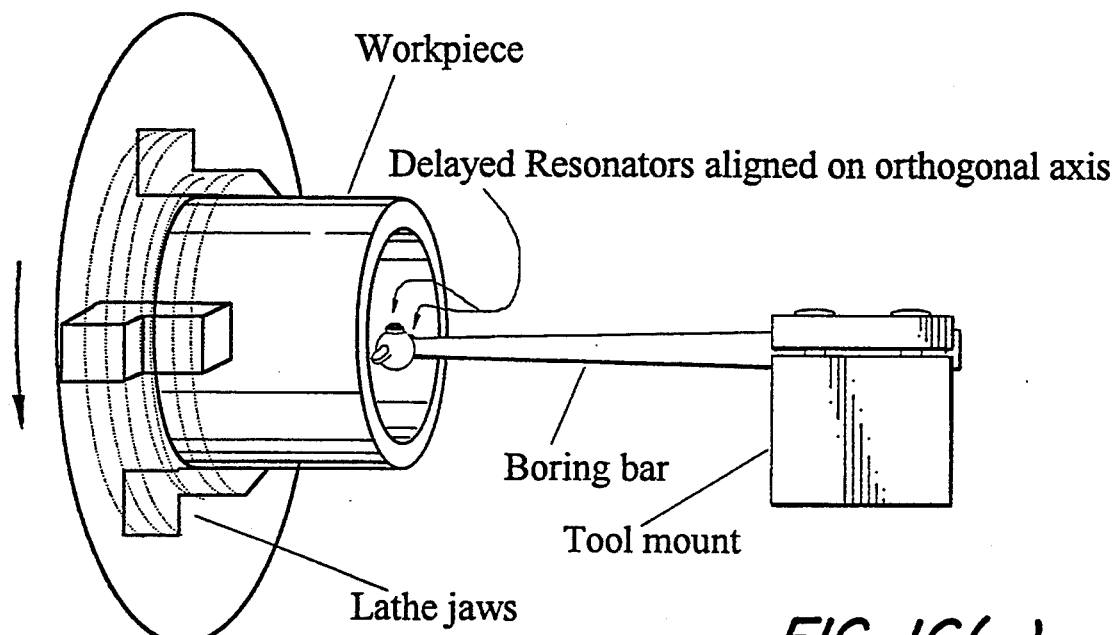
FIG. 16 diagrammatically illustrates the application of the present invention to the damping of vibrations in a boring machine.
Figure 16B:
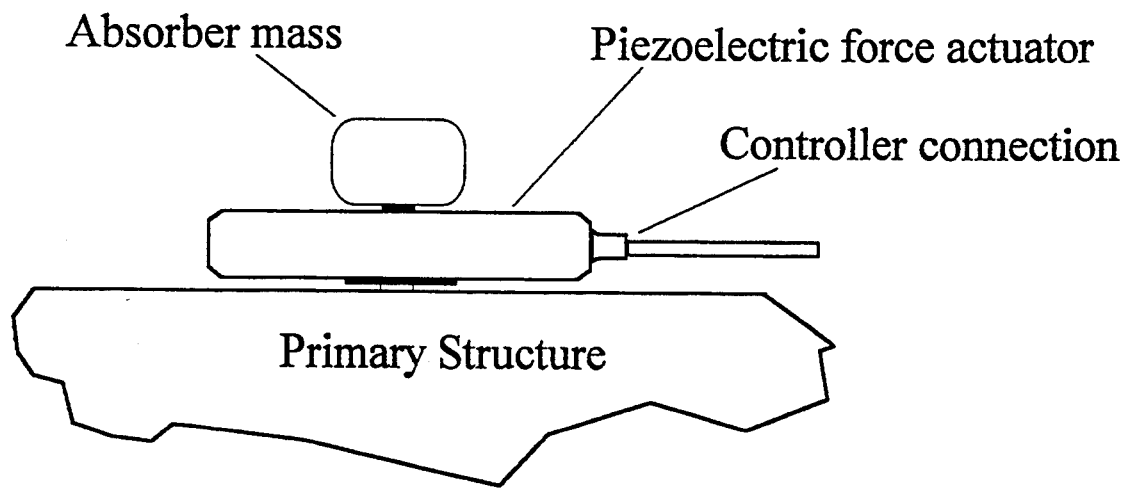

Lastly, FIG. 16 shows the application of a DR module to a boring tool to damp its vibration or chatter, and Table One provides exemplary data.

In large structures such as bridges and buildings, it will be appreciated that multiple DR modules would be spaced thereabout to damp vibrations at least in key areas to minimize fatigue. Moreover, the range of frequency to be encompassed by the DR module may be limited to encompass only the natural frequency of the basic structural member and the more significant harmonics.

The principles set forth herein to achieve an effective delayed resonance damper may be optimized for a given installation to minimize the mass of the damping member and the force required to effect its vibration. The equations set forth herein are readily introduced into algorithms for the computer control for the DR unit.

Thus, the damping method of the present invention alters the dynamics of the dissipative mass-spring-damper trio by strategic pole placement, which is achieved by a novel utilization of time delayed position feedback. The delayed resonator has a resonance frequency which is tunable in real time, and enables the absorber to eliminate the dynamic response of a primary system subject to harmonic loads of various frequencies. This technique maintains the stability of both the DR and the global structure.

Having thus described the invention, what is claimed is:

1. In a method for damping vibrations in a structure having a large mass and a natural frequency of vibration, the steps comprising:
   (a) coupling to a structure with a large mass a damping member of smaller mass;
   (b) continuously monitoring (i) the frequency of excitation of said structure produced by an applied load(s) and (ii) the displacement of said damping member
   (c) processing said monitored frequency of excitation and monitored displacement of said damping member together with data relative to the mass, stiffness and damping characteristics of said damping member;
   (d) outputting a signal to produce a variable force acting on the damping member proportional to the displacement of the damping member with a controlled time delay to produce a frequency of vibration in said damping member substantially equal to said monitored frequency of excitation of said structure and thereby to produce resonance of said damping member substantially at said monitored frequency of excitation, said resonance being effective to damp substantially said vibrations of said structure at said monitored frequency of excitation, said controlled time delay varying with the monitored displacement and monitored frequency of vibration, said output signal being variable to produce resonance of said damping member variable over a range of frequencies including the natural frequency of vibration of said structure; and
   (d) repeating steps (b), (c) and (d).

2. The method of damping vibrations in a structure in accordance with claim 1 wherein said step of producing vibration in said damping member is effected by energizing a tunable vibrating means to produce the desired frequency.

3. The method of damping vibrations in a structure in accordance with claim 2 wherein said step of energizing said vibrating means comprises providing an excitation signal of a selected frequency to an actuator to oscillate said actuator and thereby the damping member at said selected frequency.

4. The method of damping vibrations in a structure in accordance with claim 2 wherein said step of energizing said vibrating means comprises providing an excitation signal of a selected frequency to a mechanical vibrator to vibrate said damping member at said selected frequency.

5. The method of damping vibrations in a structure in accordance with claim 1 wherein said monitoring step includes monitoring a force transducer on said structure to measure the frequency of excitation.

6. The method of damping vibrations in a structure in accordance with claim 1 wherein said monitoring step includes monitoring an accelerometer on said structure.

7. A delayed resonance damping assembly for coupling to a structure subject to vibration comprising:
   (a) a support adapted to be mounted on a structure having a large mass;
   (b) a damping member having a known mass, stiffness and damping characteristics and oscillatable on said support, said mass being smaller than that of the associated structure;
   (c) means for effecting vibration of said damping member to oscillate it on said support over a range of frequencies;
   (d) means for continuously monitoring the frequency of excitation of the structure upon which said assembly is mounted;
   (e) means for continuously monitoring the displacement of said damping member during its oscillation; and
   (f) delayed feedback control means for processing the monitored frequency and the monitored displacement together with data relative to the mass, stiffness and damping characteristics of said damping member, said control means generating a signal acting on said damping member vibration means which is proportional to the displacement of said damping member, said control means providing a controlled time delay varying with the monitored frequency of vibrations and monitored displacement to produce a frequency of vibration in said damping member substantially equal to said monitored frequency of excitation of said structure and thereby to produce resonance of said damping member substantially at said monitored frequency of excitation, said resonance being effective to damp substantially said vibrations of said structure at said monitored frequency of excitation, said output signal being variable to produce resonance of said damping member variable over a range of frequencies including the natural frequency of vibration of the structure on which it is mounted.

8. The delayed resonance damping assembly in accordance with claim 7 wherein said vibration effecting means is tunable to produce the desired frequency.

9. The delayed resonance damping assembly in accordance with claim 8 wherein said vibration means is an actuator.

10. The delayed resonance damping assembly in accordance with claim 8 wherein said vibration means is a mechanical vibrator.

11. The delayed resonance damping assembly in accordance with claim 8 wherein said excitation frequency monitoring means is a force transducer.

12. The delayed resonance damping assembly in accordance with claim 8 wherein said excitation frequency monitoring means is an accelerometer.

* * * * *